US008235137B2

(12) United States Patent
Walker et al.

(10) Patent No.: US 8,235,137 B2
(45) Date of Patent: Aug. 7, 2012

(54) MODE CHANGE MECHANISM FOR A POWER TOOL

(75) Inventors: Andrew Walker, Durham (GB); George Fung, Tseung Kwan (HK)

(73) Assignee: Black & Decker Inc., Newark, DE (US)

( * ) Notice: Subject to any disclaimer, the term of this patent is extended or adjusted under 35 U.S.C. 154(b) by 299 days.

(21) Appl. No.: 12/299,623

(22) PCT Filed: May 18, 2007

(86) PCT No.: PCT/EP2007/054844

§ 371 (c)(1), (2), (4) Date: Nov. 5, 2008

(87) PCT Pub. No.: WO2007/135107

PCT Pub. Date: Nov. 29, 2007

(65) Prior Publication Data

US 2009/0101376 A1 Apr. 23, 2009

(30) Foreign Application Priority Data

May 19, 2006 (EP) .................................... 06114236

(51) Int. Cl.
*B23B 45/02* (2006.01)

(52) U.S. Cl. ........................... 173/47; 173/216; 173/217

(58) Field of Classification Search .............. 173/2, 176, 173/178, 47, 48

See application file for complete search history.

(56) References Cited

U.S. PATENT DOCUMENTS 3,808,904 A * 5/1974 Gotsch et al. .................... 74/343
3,835,715 A * 9/1974 Howell ........................... 173/48
4,158,970 A * 6/1979 Laughon ......................... 74/526
4,823,885 A * 4/1989 Okumura ....................... 173/178
4,892,013 A * 1/1990 Satoh ............................ 475/266
5,025,903 A * 6/1991 Elligson .......................... 192/83
5,451,127 A * 9/1995 Chung ............................ 408/20
5,550,416 A * 8/1996 Fanchang et al. ............... 310/83
5,588,496 A * 12/1996 Elger ............................ 173/178
5,704,433 A * 1/1998 Bourner et al. ................. 173/48
6,142,242 A * 11/2000 Okumura et al. ............... 173/48
6,142,243 A * 11/2000 Mayer ........................... 173/176
6,152,242 A * 11/2000 Chung ............................ 173/48

(Continued)

FOREIGN PATENT DOCUMENTS

EP 0302229 2/1989

(Continued)

*Primary Examiner* — Lindsay Low

(74) *Attorney, Agent, or Firm* — Stephen R. Valancius

(57) ABSTRACT

A power tool (10) is described which has several modes of operation, such as drilling and screw driving modes. A clutch is provided with various settings for adjusting the torque at which the clutch interrupts power to a spindle (18). Furthermore, a two speed gearbox (16) is provided for adjusting the speed of the spindle. All of these variables are controllable from a single adjustment member or collar (26) thereby reducing necessary decisions needed to be made by an operator for a particular job in hand. For instance, when an operator wants the tool to operate in a screw driving mode, the gearbox is automatically set to drive the spindle at a low speed with the clutch being operable to interrupt drive when a torque force applied to the spindle exceeds a threshold value. Furthermore, if the tool is required to operate in a drilling mode, the gearbox is automatically switched to drive the spindle at a higher speed and the clutch is automatically rendered inoperable.

20 Claims, 5 Drawing Sheets

U.S. PATENT DOCUMENTS

| | | | | |
|---|---|---|---|---|
| 6,196,076 | B1 * | 3/2001 | Chung | 74/22 A |
| 6,202,759 | B1 * | 3/2001 | Chen | 173/48 |
| 6,230,819 | B1 * | 5/2001 | Chen | 173/48 |
| 6,431,289 | B1 | 8/2002 | Potter | |
| 6,457,535 | B1 * | 10/2002 | Tanaka | 173/48 |
| 6,502,648 | B2 | 1/2003 | Milbourne | |
| 6,655,473 | B1 * | 12/2003 | Chi | 173/216 |
| 6,688,406 | B1 * | 2/2004 | Wu et al. | 173/48 |
| 6,745,883 | B2 * | 6/2004 | Eto et al. | 192/56.62 |
| 6,796,921 | B1 * | 9/2004 | Buck et al. | 475/299 |
| 6,892,827 | B2 * | 5/2005 | Toyama et al. | 173/48 |
| 6,926,095 | B2 * | 8/2005 | Chen | 173/48 |
| 6,983,810 | B2 * | 1/2006 | Hara et al. | 173/176 |
| 7,762,349 | B2 * | 7/2010 | Trautner et al. | 173/176 |
| 2001/0035326 | A1 * | 11/2001 | Furuta et al. | 192/56.61 |
| 2004/0157698 | A1 * | 8/2004 | Hara et al. | 475/298 |
| 2004/0211575 | A1 * | 10/2004 | Soika et al. | 173/48 |
| 2004/0211577 | A1 * | 10/2004 | Zhao | 173/178 |
| 2004/0245005 | A1 * | 12/2004 | Toyama et al. | 173/48 |
| 2005/0224242 | A1 * | 10/2005 | Britz et al. | 173/15 |

FOREIGN PATENT DOCUMENTS

| | | | |
|---|---|---|---|
| EP | 1555091 | | 7/2005 |
| GB | 2334910 | | 9/1999 |
| GB | 2334911 | | 9/1999 |
| GB | 2404891 A | * | 2/2005 |

* cited by examiner

MODE CHANGE MECHANISM FOR A POWER TOOL

The present invention relates to a mode change mechanism for a power tool, and in particular, but not exclusively, to a mode change mechanism which allows an operator to change the operating mode of an electrically powered drill/screwdriver.

Electrically powered drill/drivers are known and can operate in many modes. For instance, the output speed of the spindle can be changed, generally between two speeds (although three-speed gearboxes for this type of screwdriver are known); the drill can operate in rotary or hammer mode; and the torque at which the drive to the output is interrupted can be set by setting a clutch to ratchet when a pre-determined torque force is applied to the output.

Typically, a dedicated mode selection switch is provided for each mode change capability. Thus, there is usually one switch for changing the output, another for changing between screw driving and hammer modes, and a further switch for selecting the maximum output torque. This can lead to a confusing array of modes in which the drill can operate. As a result an operator may often choose the wrong mode of operation for the job in hand, leading to inefficient and/or inappropriate use of the tool.

Attempts to reduce the number of mode change switches have been made, some of which are now described. For instance, a drill is described US 2005/0224242 A, comprising a control handle for selecting one of the hammer drill functions.

EP 1555091 describes a driver drill that can effectively prevent erroneous clutch operation in a drill mode. A flat washer positioned between steel balls for locking an internal gear and a coil spring is rotatable by rotative operation of a mode-change ring. Also, protruding streaks are provided on a small-diameter unit of a second gear case around which a flat washer is externally mounted. The protruding streaks interfere with internal projections on an inner circumference of the flat washer at its predetermined rotating position to regulate a forward movement of the flat washer. When a drill mode is selected with the mode-change ring, the flat washer is locked by the protruding streaks.

U.S. Pat. No. 6,142,243 describes a hand held power tool having a coupling formed for transmission of torques of different values and including at least two coupling parts provided with transmission members for rotary-fixed connection with one another, a coupling spring having an adjustable tensioning force operable for holding one of the coupling members of one of the coupling parts in a rotary-locked engagement with another of the coupling members of another of the coupling parts, and blocking members with which the coupling parts are rotary-fixed coupled in addition to the transmission members, and which can be brought into engagement with one another in a drilling operation or an impact drilling operation for transmitting a maximum torque.

GB 2334910 describes a hand-held tool having a tool spindle and a clutch which is disposed in a drive chain between a electric motor and the said tool spindle and has an adjusting member for setting different modes of operation, the adjusting member has at least one setting position in which the clutch is rigidly switched as a result of a connection of its clutch parts which is form-locking in the direction of rotation or which disengages at a maximum overload torque.

U.S. Pat. No. 6,502,648 describes an adjustment mechanism for a clutch. The adjustment mechanism includes an annular adjustment structure having an adjustment profile with a ramp section, a first adjustment segment, a last adjustment segment and a plurality of intermediate adjustment segments. The first adjustment segment is configured to correspond to a first clutch setting and the last adjustment segment is configured to correspond to a last clutch setting. The ramp section is positioned between the first and last adjustment segments such that the adjustment structure is rotatable between the first and last adjustment segments and between the last and first adjustment segments without engaging any of the intermediate adjustment segments.

U.S. Pat. No. 6,431,289 describes a multi-speed transmission assembly for a rotary power tool. The transmission assembly includes a plurality of transmission stages, with at least two of the transmission stages employing a movable reduction element that permits the transmission stage to be operated in an active mode and an inactive mode. The movable reduction elements are coupled to a switching mechanism that switches the reduction elements in a predetermined manner to provide at least three-gear reduction or speed ratios.

U.S. Pat. No. 6,142,243 describes a hand-held electrical tool which has an electric motor-driven tool spindle and a torque clutch which is disposed in a drive chain between the electric motor and the tool spindle. A manual setting member is provided for presetting of the torque, and rigid of transmission of the torque. The setting member having at least one setting position in which the torque clutch is rigidly connected as a result of a connection of its clutch parts which is form-locking in the direction of rotation.

GB 2334911 describes an electric hand tool machine having a tool spindle driven by an electric motor, a torque clutch disposed in a transmission path between electric motor and wherein the tool spindle has a manual setting element for setting different torque steps. For the purpose of varying the setting element from machine to machine without modifying the gear unit required for setting purposes, the setting element is divided into a shift ring, which executes the setting function and is rotatable about the machine axis, and a design ring non-rotatably connected to the shift ring for the manual rotary operation.

The present invention aims to provide an improved mode change switch arrangement which, in brief, automatically selects the correct mode of operation according to the job in hand selected by the operator. In order to achieve this a single manually operable mode change dial is provided on the tool which can change the output speed, select a suitable torque force at which drive to the output spindle is interrupted, and select drill or impact hammer mode where appropriate, according to the setting selected by the operator. Where a drill mode is selected, be it for drilling into wood or masonry (where hammer action is required), the clutch should be locked-out so that drive from the motor can not be interrupted by the clutch; the clutch is rendered inoperable in these modes.

More specifically, the present invention provides a manually operable electrically powered tool, comprising: an electric motor disposed in a housing; a drive train disposed between the motor and a tool spindle, comprising: a gearbox coupled to the motor and being arranged for changing the rotational speed of the spindle between a first and a second speed, and a clutch for interrupting drive from the motor to the spindle when a predetermined torque is applied to the spindle, wherein the clutch comprises two components urged together by a spring such that the first and second components are held together relative to one another when a torque force applied to the spindle is less than a spring force; and an adjustment member for setting different modes of operation, the adjustment member being coupled to the gearbox and clutch, the adjustment member being moveable between a first and Nth position such that, when the adjustment member is in the range of positions between the first and N−1 positions the tool is operable in a screw driving mode and the spring force applied to the clutch components can be varied, and, when the adjustment member is in the Nth position the tool is operable in a drilling mode and the clutch is inoperable. Thus, when in the drilling mode, the clutch is locked-out and the first and second clutch components are held fixedly together. As a result, the clutch should not interrupt drive to the spindle when the tool is in the drilling mode.

Preferably, the speed of rotation of the spindle is changeable between the first and second speeds when the adjustment member is moved between the N and N−1 position. As a result, the tool can operate at a relatively low spindle speed when in the screw driving mode and at a relatively high spindle speed when in the drilling mode. Thus, the correct or most appropriate spindle speed is pre-selected for the job in hand, that is either drilling or driving screws. Furthermore, automatic locking of the clutch when the tool is selected to operate in a drilling mode further assists the operator with a most appropriate mode selection.

Preferably, an impact mechanism for providing hammer action to the spindle is provided, wherein the adjustment member is moveable to an N+1 position and the impact mechanism is activated when the adjustment member is in the N+1 position. Preferably, the clutch is inoperable when the adjustment member is in the N+1 position. Thus, the tool can operate in a hammer mode for drilling into masonry or the like.

Preferably, the clutch further comprises a thrust plate for transmitting the spring force to the second component of the clutch, the clutch plate having one or more tangs extending therefrom and arranged to engage with the adjustment member when the adjustment member is in the Nth position. Thus, the thrust plate is locked in position when the adjustment member is in the Nth position, thereby preventing the clutch from slipping or interrupting drive to the spindle.

Preferably, the adjustment member further comprising a first inner surface having one or more protrusions against which the thrust plate tangs are engageable when the adjustment member is in the Nth position. This arrangement provides a simple and/or effective manner in which to realise the present invention.

Preferably, the thrust plate in immoveable in an axial direction when the adjustment member is in the Nth position. Thus, the first and second clutch components are held together and the clutch can not interrupt drive to the spindle.

Preferably, the second clutch component comprises a plurality of ball bearings each disposed in a respective detent formed in a portion of the thrust plate. Preferably, the first clutch component is coupled to, or integral with, a gear in the gearbox and comprises one or more ramps over which a ball bearing can pass when a torque force applied to the spindle exceeds a spring force applied to the second clutch component. Preferably, the gear is a ring gear in a planetary gearbox. These arrangements provide a simple and/or effective manner in which to realise the present invention.

Preferably, the adjustment member further comprises a second inner surface coupled to a gearbox linkage, the second surface being arranged such that the linkage is moveable between a first setting and a second setting when the adjustment member is moved between the N and N−1 positions respectively. Preferably, during use, the rotational speed of the spindle changes between the first and second speeds when the linkage is moved between the first and second setting.

Thus, a single adjustment member is provided for switching the gearbox output speed (and hence the spindle speed) and for adjusting the clutch setting to vary the required torque applied to the spindle needed to cause the clutch to interrupt drive to the spindle. The same adjustment member can be used to switch to a hammer/impact mode. As a result, the operator is only faced with a single mode selection switch, thereby simplifying the decision process with respect to choosing the correct or most appropriate mode selection for various jobs which can be undertaken by the tool.

Preferably, simple and/or easy to read or understand icons are provided on the adjustment member which are visible to the operator during use, and which indicate different jobs which the tool can undertake. For instance an icon can be provided to indicate a drill-bit for a drilling job, wherein the tool is set to drilling mode when this icon is aligned to an indication arrow or the like on the housing. Furthermore, icons showing screws of various sizes can be arranged to indicate different torque settings at which the clutch would interrupt drive to the spindle, depending on the size of the icon (a larger icon indicating a relatively high torque force being required to interrupt drive to the spindle, for instance). A hammer icon can be used to indicate hammer-action mode.

An embodiment of the present invention is now described by way of example with reference to the following drawings, of which:

Figure 1:
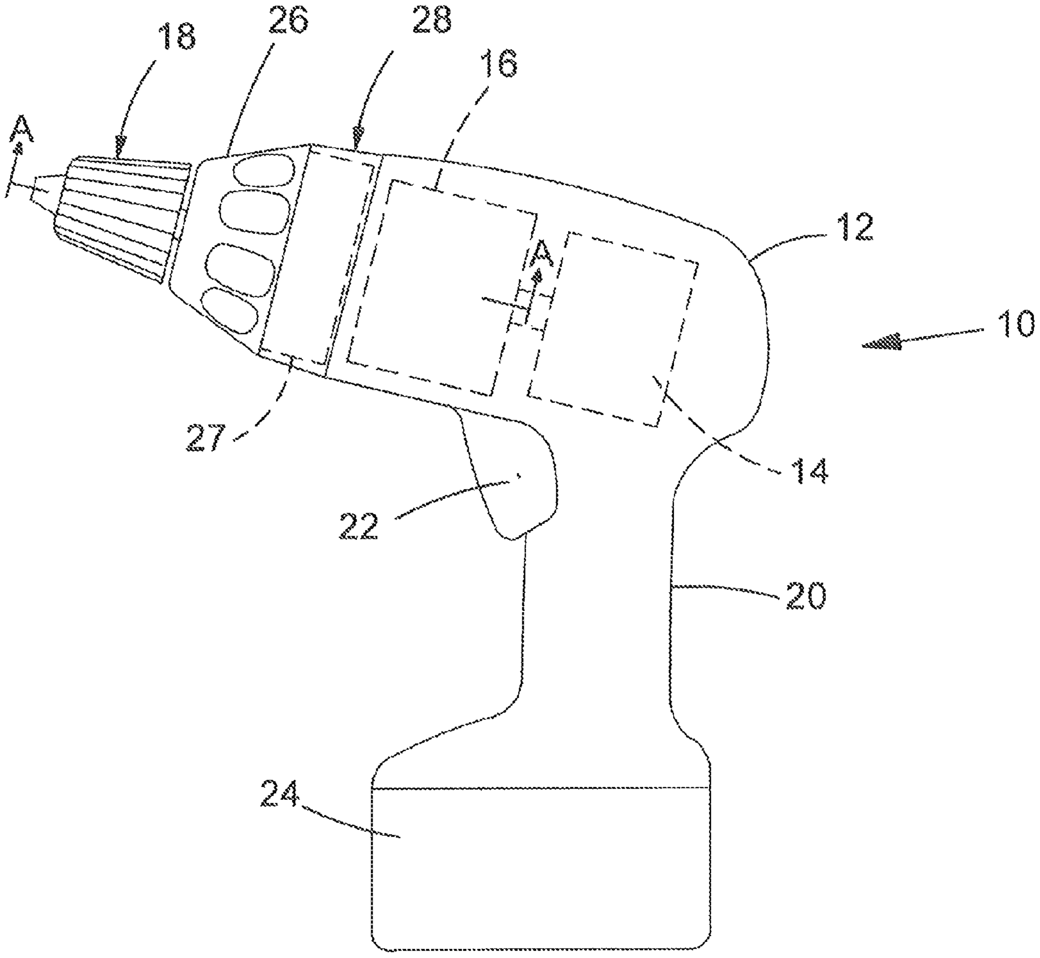
FIG. 1 is a schematic diagram of a tool embodying the present invention.

Referring to FIG. 1, a cordless tool 10 embodying the present invention is shown. The tool comprises a housing 12 in which a motor 14 and gearbox/drive train 16 are disposed. The gearbox is coupled to the motor and comprises a clutch mechanism for interruption of motor drive to an output spindle 18 when a torque force greater than a predetermined threshold is applied to the spindle. The gearbox also comprises two or more settings for varying the output speed of the spindle. A percussion mechanism can also be included in the drive train for providing a hammer action mode of operation for drilling into masonry.

A handle portion 20 of the body comprises a switch 22 for operating the motor, and hence the tool. A battery pack 24 can be disposed at the base of the handle, thereby providing means to power the tool. Of course, other forms of power can be used, such as mains supplied electricity.

A collar 26 is provided for selecting the mode of operation of the tool. The collar is linked to the drive train components so that adjustments can be made to the output speed of the spindle, the torque force required to interrupt drive to the spindle, and (if available) the mode of spindle action (hammer, non-hammer modes). Thus, a single adjustment member is provided for selecting the appropriate mode of operation of the tool, depending on the operator's requirements.

Furthermore, a large amount of decision making required for correct mode selection with previous tools is no longer required with tools embodying the present invention. With conventional tools, the user is required to decide the torque setting, the spindle speed and spindle action mode according to the job requirements. Often, an incorrect decision would be made resulting in inefficient or inappropriate use of the tool's operational modes. The situation with conventional tools is compounded by the number of mode switches; as discussed above, there being a switch for each of the spindle speed, spindle action mode and torque settings. However, by providing a single mode selection switch, embodiments of the present invention simplify the selection process for the operator.

The selection process can be further simplified by arranging easily recognisable icons on a covered portion 27 of the collar. These icons can be arranged to represent the job in hand. For instance, a screw can be used to represent when the tool is operating in a screw driving mode (hammer action OFF, clutch ON, low spindle speed ON). Likewise, a drill bit can be used to represent when the tool is operating in a drilling mode. The icons can be arranged to appear in a transparent portion 28 of the housing which overlaps the covered portion 27 of the collar.

Table 1 below provides a matrix of the operating modes and drive train components settings according to the chosen mode. The component settings are arranged such that the best or most efficient operational characteristics of the tool are chosen for the job in hand. (Where, for instance, the clutch is described as "OFF", this indicates that the clutch has been locked-out).

TABLE 1

| Operation | Clutch | Spindle Speed | Impact Mechanism |
|---|---|---|---|
| Screw Driving | ON | LOW | OFF |
| Drilling (wood or metal) | OFF | HIGH | OFF |
| Drilling (masonry) | OFF | HIGH | ON |

During screw diving mode, the collar is rotatable between a $1^{st}$ position and N−1 position (where N is an integer). The collar is rotatable further to an Nth position where the drilling mode is engaged. If appropriate, the collar can be further rotated to an N+1 position where further drilling modes can be engaged, for instance for drilling into masonry. As a result, there can be several positions of the collar where the clutch is locked-out.

The collar can be indexed to provide positive locating of the collar in each of the positions from the first to N+1 position.

A number of torque settings can be provided in the screw driving mode so that the clutch is arranged to interrupt drive to the spindle when a different torque force is applied to the spindle. Thus, a series of torque forces applicable by the spindle to a screw can be provided. These various torque settings can be indicated to the operator as a series of screw icons increasing in size to indicate an increasing torque force required to cause the clutch to ratchet or interrupt drive to the spindle.

Figure 2:
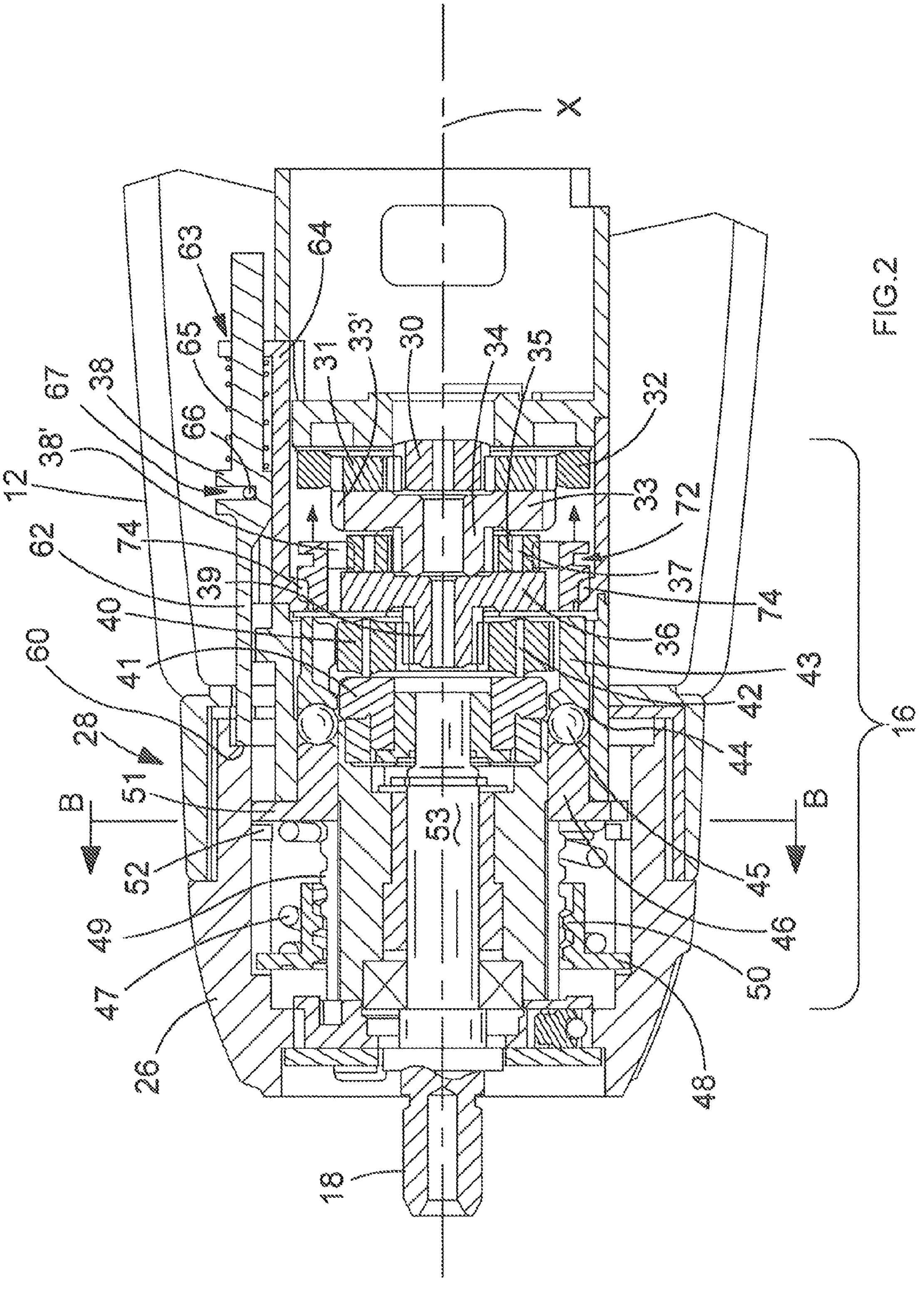
FIG. 2 is a schematic cross section of the tool shown in FIG. 1, taken along line AA in FIG. 1.

Referring now to FIG. 2, a cross section of the tool in FIG. 1 is shown. Components common between the figures have the same indication numerals. The tool has a longitudinal axis X about which the spindle 18 is rotated by the motor via the drive train 16.

The gearbox of the drive train is a planetary-type gearbox. The motor (not shown), during use, drives a first gear cog 30. The first cog is coupled to first planetary gears 31 which are arrange to mesh with, and be coupled to a fixed first ring gear 32 (fixed with respect to a gearbox's housing). Thus, during use, the first planet gears run inside the first ring gear. The first planetary gears are coupled to a first spider gear by pinions. Thus, rotation of the first planetary gears around the inside of the first ring gear causes rotation of the first spider gear. This arrangement constitutes the first gear reduction.

The second gear reduction operates on similar principles. Secondary planetary gears 35 are driven by a second drive gear 34 disposed on the first spider gear 33. The secondary planet gears are coupled to a secondary spider gear 36 via pinions 37. The secondary planet gears run inside a second ring gear 38. The second ring gear is moveable to allow the output speed of the gearbox to be changed. In the arrangement shown in FIG. 2 the second ring gear allows the second planet gears to run on it's inside gear teeth 38'. However, when moved to a second position the inside gear teeth 38' mesh with the gear of the second planet gears and teeth 33' disposed on the outer surface of the first spider gear 33. Thus, the second gear reduction is directly coupled to the first gear reduction when the second gear ring is in the second position thereby rendering the second gear reduction to operate at a 1:1 gear reduction (that is, no reduction is achieved from the second gear, when the second ring gear is in the second position). In the first position, the secondary ring gear is radially locked in position so that it can not rotate. However, when in the second position, the secondary ring gear is free to rotate about the X axis, as described in more detail below.

A third drive gear 39 is coupled to the secondary spider gear and is arranged to drive tertiary planet gears 40. The tertiary planet gears are coupled to a drive plate 41 via pinions 42. Furthermore, the tertiary planet gears mesh with and run inside a tertiary ring gear 43. Thus, the drive plate 41 is driven by the tertiary planet gears. The drive plate is coupled to the spindle 18.

The tertiary ring gear forms a component of a torque clutch. A top surface 44 is arranged to engage with a series of ball bearings 45. The ball bearings also cooperate with a thrust plate 46 which transmits a spring force from a compressed spring 47, thereby urging the ball bearings against the top surface 44 of the tertiary ring gear 43. The top surface comprises a track in which the ball bearings can run. This track further comprises ramp over which the ball bearings can pass. Thus, the track has a profile consisting of valleys and peaks.

Under normal operating conditions, the tertiary ring gear is held in position by the action of the ball bearing being urged by the thrust plate and spring into the track's valleys. As a result, the tertiary ring gear does not move in an axial or radial direction and drive is transmitted to the spindle.

When a torque force is applied to the spindle an equal and opposite force is experienced by the components in the gear train. Thus, if a torque force is applied to the spindle which exceeds a threshold value, another torque force is experienced by the tertiary gear which can overcome the spring force urging the ball bearings into the valleys of the top surface's profile. As a result, the ball bearings can ride over the peaks in the profile of the top surface and the tertiary gear can rotate about the axis X. Thus, no drive is transmitted to the spindle: The clutch ratchets-out and interrupts drive to the spindle.

The spring 47 is compressed between the thrust plate 46 and a spring carrier 48. The carrier is coupled to the collar and a threaded component 49. A similarly threaded portion 50 of the carrier cooperates with the threaded component such that, when the collar is twisted about the axis X, the spring carrier moves axially along the axis X, thereby compressing or decompressing the spring and changing the spring force applied to the thrust plate. Thus, the torque force required to cause the clutch to ratchet can be varied.

In a conventional tool the clutch can be locked out by bringing the spring carrier into engagement with the thrust plate, thereby preventing the ball bearings from riding over the peaked top surface profile. However, embodiments of the present invention require further movement of the collar in order to switch to further operational modes. In the embodiment described here, the collar is rotated further to at least one position, two or more positions might be needed if different drilling modes are presented to the operator. (It should be noted that the collar could also be arranged to move longitudinally to switch to a drilling mode). The additional rotational movement of the collar causes the spring carrier to further compress the spring and move axially towards the thrust plate. Thus, the spring carrier can not engage with the thrust plate to lock-out the clutch if further movement of collar is required beyond the N−1 position.

Figure 3:
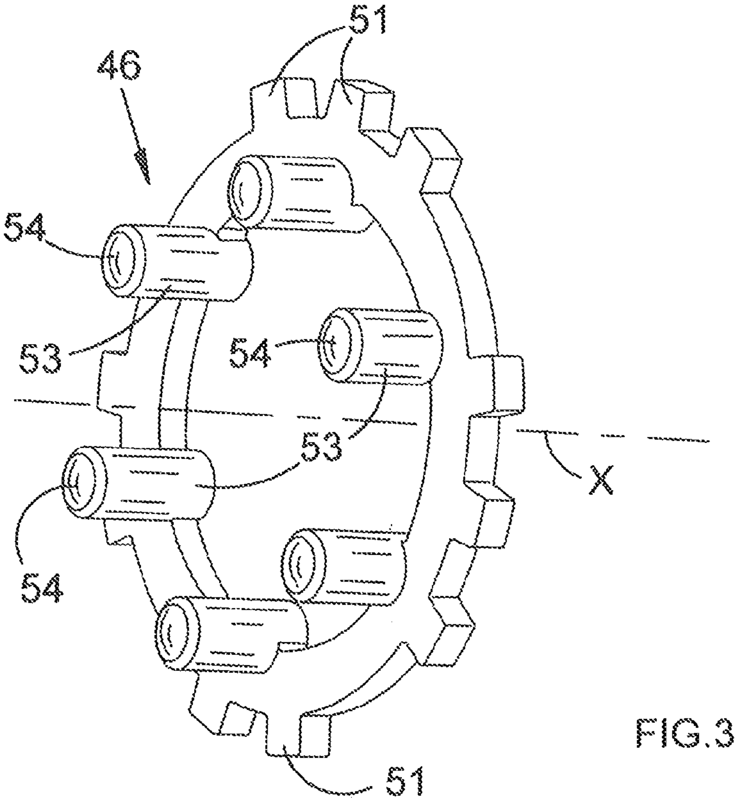
FIG. 3 is a schematic diagram of a thrust plate used by an embodiment of the present invention.
Figure 4:
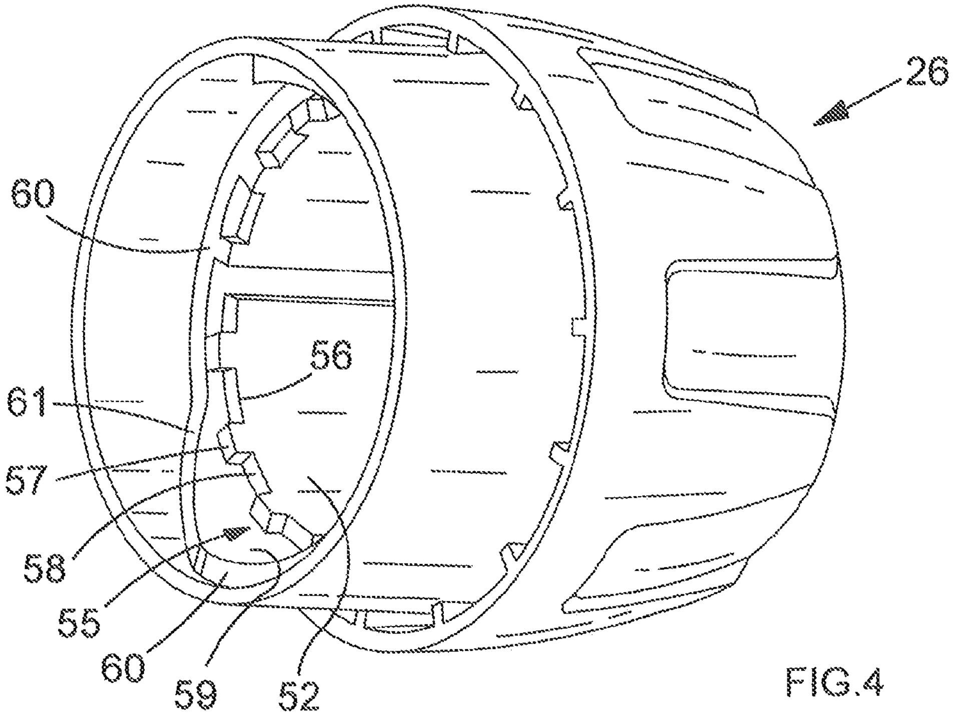
FIG. 4 is a schematic diagram of an adjustment member used by an embodiment of the present invention.
Figure 5:
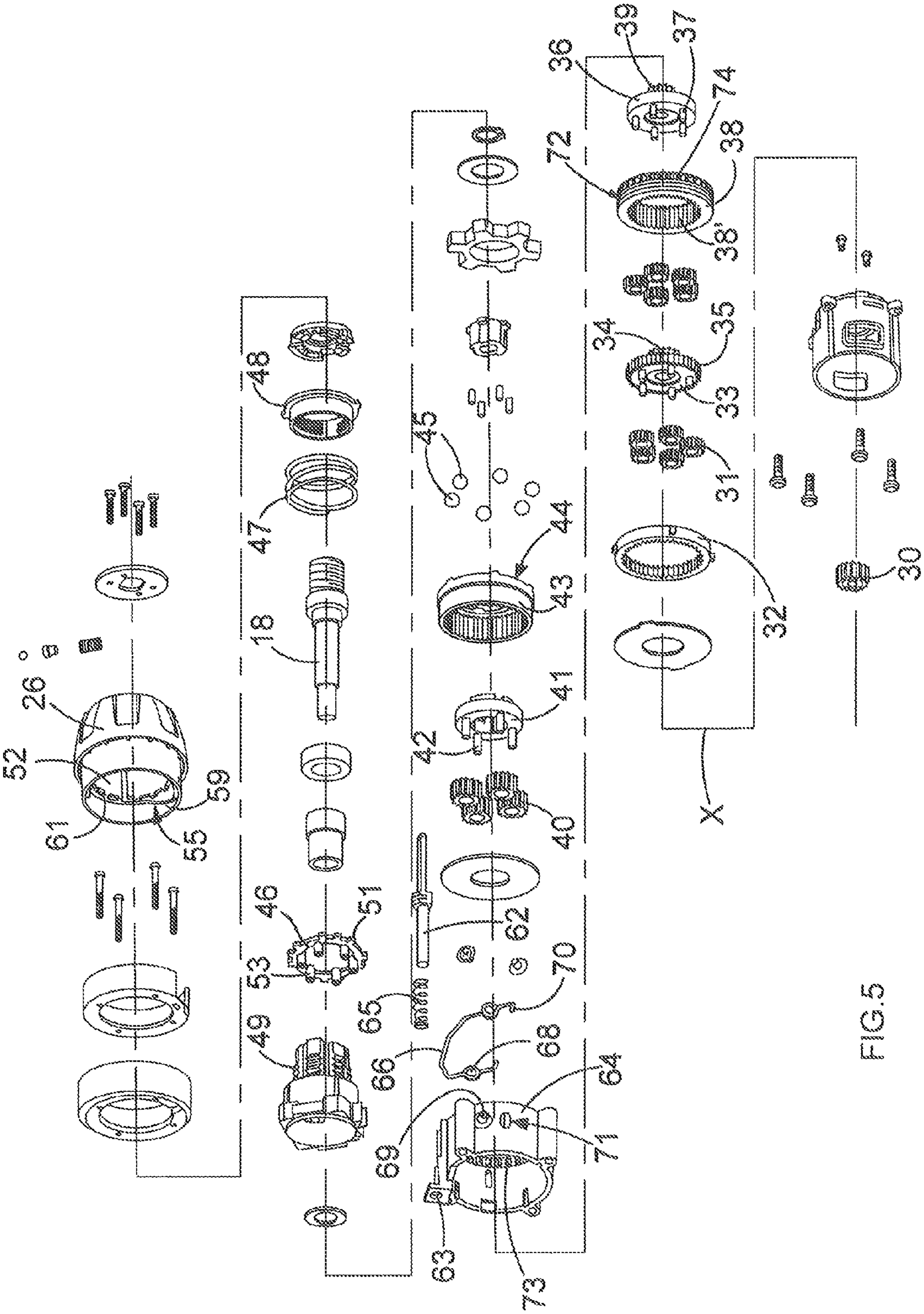
FIG. 5 is an exploded view of the components shown in FIG. 2.

Referring now to FIGS. 2, 3 and 4, the thrust plate 46 comprises a series of tangs 51 extending radially from the thrust plate. Reference can also be made to FIG. 5 which shows the component of the tool shown in FIG. 2 in an exploded format.

The tangs are arranged to cooperate with a first inner 52 surface of the collar. The thrust plate further comprises a series of rods 53 extending longitudinally in the X axis direction, the end surfaces 54 of which are concaved for accommodating one of the ball bearings 45. The first inner surface 52 of the collar 26 comprises a castellation-profiled surface 55 comprising an annular-formed castellation 56. The castellation comprises a series of square profiled teeth 57 between each of which is disposed a square-profiled gap or trough 58.

When the tool is operating in the drilling mode(s) the teeth 57 are arranged adjacent to or above the tangs such that the teeth abut against the tangs of the thrust plate thereby locking the clutch; the thrust plate is unable to move axially and, as described above, the ball bearings of the clutch can not ride of the peaks of the tertiary ring gear's profiled surface 44. When operating in a screw driving mode, the tangs are located alongside the troughs 58; the tangs and troughs are juxtaposed. As a result, the axial movement of the thrust plate is unimpeded by the inner surface of the collar and the clutch can operate as described above.

The collar indexing system (that is, the mechanism used to ensure appropriate radial displacement of the collar between the various mode settings) is arranged such that there is equal displacement between the settings for various torque requirements in the screw driving mode. Thus, when the collar is rotated from one torque setting to another, the teeth 57 on the inner surface 52 pass over the tangs 51 of the thrust plate 46; the indexing system positively locates the collar so that the next adjacent trough is located above the tang when the collar is moved to an adjacent torque setting. However, when the collar is moved from the N−1 to N position (that is, when the mode of operation of the tool is switched from screw driving to drilling) a different angular displacement of the collar is required so that the teeth 57 are now aligned above the tangs 51.

The collar comprises a second inner surface 59 for changing the speed of the spindle. The second surface comprises a track 60 which has a ramp portion 61. The track is arranged to engage with a gear linkage 62 (see FIG. 2) which is moveable in a longitudinal direction parallel to the X axis. The track is arranged such that the linkage remains in a first position when the collar is in any of the first to N−1 positions. When the collar is moved to the Nth position to engage the drilling mode(s), the linkage 62 is moved to a second position by the ramp. Thereafter, when the collar is moved to N+1 and any further positions, the linkage remains in the second position. Thus, rotation of the collar between the N−1 and Nth position causes the linkage to move between the first and second position by the coupling arrangement of the linkage with the track 60 and ramp 61. The linkage is coupled to the moveable second ring gear 38 such that the second ring gear moves between a first and second position (as described above) when the linkage in moved. As a result, the speed of the spindle can be changed by moving the collar from the N−1 to N position.

The linkage passes through an aperture 63 of the gearbox housing 64 and is urged against the track 60 by a spring 65. A cradle 66 is disposed in a groove 67 of the linkage. The cradle is pivotally mounted on the gearbox housing at pivot point 68 and 69. One end 70 of the cradle passes through a porthole 71 in the gearbox housing and engages with a groove 72 in the sliding ring gear 38. In a first position, as shown in FIG. 2, a series of teeth 73 disposed on an inner surface of the gearbox housing mesh with and cooperate with reciprocal teeth 74 on the outer surface of the secondary ring gear 38. Thus, the secondary ring gear is unable to rotate about the X axis when it is in this first position. When the linkage is moved forward, the secondary ring gear 38 is slid backwards towards the motor-end of the gearbox. As a result, the engaged teeth 73 and 74 become disengaged and the secondary gear can rotate about the X axis. As this disengagement occurs, the inner teeth 38' of the secondary gear lock the secondary planet gears 35 to the gear teeth 33' of the first spider 33, as described above.

Figure 6:
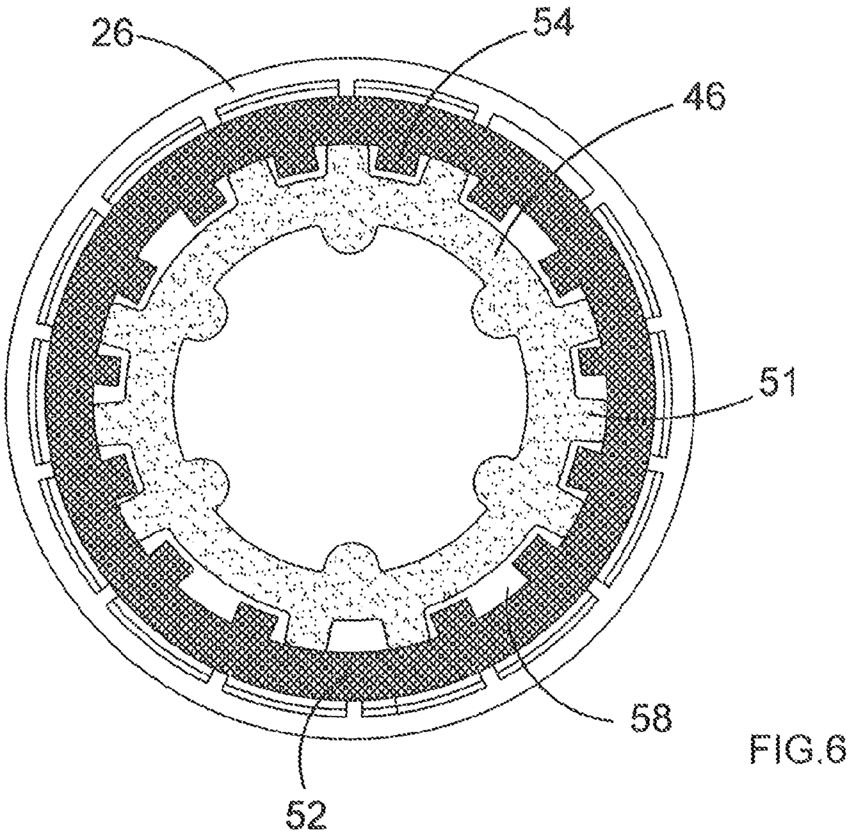
FIGS. 6 and 7 are schematic views of a cross section along line BB in FIG. 2, showing two different modes of operation as selected by an embodiment of the present invention.
Figure 7:
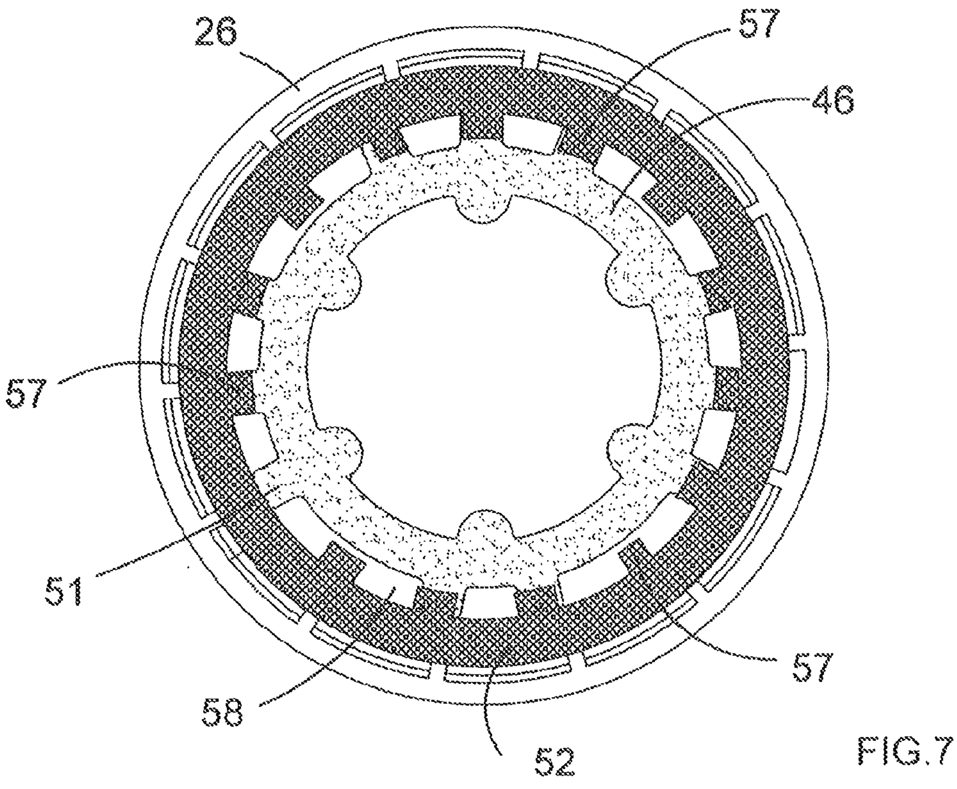

FIGS. 6 and 7 show the thrust plate and inner surface components as taken along a cross section line BB shown in FIG. 2. Referring to FIG. 6, the thrust plate is shown with the collar arranged so that the tool is in the screw driving mode. As a result, the tangs 51 are arranged so that they are juxtaposed with the troughs 58 of the inner surface 52. The teeth 57 are arranged between adjacent tangs. Referring now to FIG. 7, the collar is arranged so that the tool operates in a drilling mode where the clutch is disabled. Here, the tangs and teeth are arranged to cooperate with one another, as described previously.

As is known in the art, a percussion hammer action mode can be initiated by further rotation of the collar from position N to position N+1.

Thus, all of the tool's variables are controllable from a single adjustment member or collar thereby reducing necessary decisions needed to be made by an operator for a particular job in hand. For instance, when an operator wants the tool to operate in a screw driving mode, the gearbox is automatically set to drive the spindle at a low speed with the clutch is arranged to be operable and interrupt drive when a torque force applied to the spindle exceeds a threshold value. Furthermore, if the tool is required to operate in a drilling mode, the gearbox is automatically switched to drive the spindle at a higher speed and the clutch is automatically rendered inoperable.

The skilled person will be able to envisage different embodiments of the present invention without departing from the overall scope of the invention. For instance, the collar might be moveable in a longitudinal direction in order to activate drilling mode(s). The longitudinal movement could be prevented whilst the tool is in a screw driving mode. Thus, rotational movement of the collar could be provided between the first and N−1 position, and longitudinal movement of the collar can be arranged thereby enabling movement of the collar from the N−1 to the Nth position. Further longitudinal or rotational movement of the collar can be arranged such that the collar is moveable from the Nth to the N+1 position for switching between various drilling modes.

The invention claimed is:

1. A manually operable electrically powered tool, comprising:

an electric motor disposed in a housing;

a drive train disposed between the motor and a tool spindle, comprising:

a gearbox comprising a plurality of gears, the gearbox being coupled to the motor and being arranged for changing the rotational speed of the spindle between a first and a second speed, and a torque limiter which limits drive to the spindle when a predetermined torque is applied to the spindle; and an adjustment member for setting different modes of operation, the adjustment member being moveable between a first and Nth position such that, when the adjustment member is in the range of positions between the first and N−1 positions the tool is operable in a screw driving mode and the torque at which the torque limiter limits drive to the spindle can be varied, and, when the adjustment member is in the Nth position the tool is operable in a drilling mode and torque to the drive spindle is not varied;

wherein the speed of rotation of the spindle is changed between the first and second speeds by axial movement of one of the plurality of gears relative to the housing when the adjustment member is moved between the N−1 and Nth position.

2. A tool according to claim 1, further comprising an impact mechanism for providing hammer action to the spindle, wherein the adjustment member is moveable to an N+1 position and the impact mechanism is activated when the adjustment member is in the N+1 position.

3. A tool according to claim 2, wherein the torque limiter is inoperable when the adjustment member is in the N+1 position.

4. A tool according to claim 1, wherein the adjustment member changes the gearbox between the first and second speeds through a gear linkage which moves in a direction along or parallel to a longitudinal axis of at least one of the spindle and the motor.

5. A tool according to claim 1, wherein the gearbox is a planetary type gearbox and the at least one of the plurality of gears is a ring gear.

6. A manually operable electrically powered tool, comprising:

an electric motor disposed in a housing;

a drive train disposed between the motor and a tool spindle, comprising:

a gearbox coupled to the motor and being arranged for changing the rotational speed of the spindle between a first and a second speed, and a clutch for interrupting drive from the motor to the spindle when a predetermined torque is applied to the spindle, wherein the clutch comprises two components urged together by a spring such that a first component is held in a stationary position relative to a second component when a torque force applied to the spindle is less than a threshold spring force; and an adjustment member for setting different modes of operation, the adjustment member being mechanically coupled to the gearbox and clutch, the adjustment member being moveable between a first and Nth position such that, when the adjustment member is in the range of positions between the first and N−1 positions the tool is operable in a screw driving mode and the spring force applied to the clutch components can be varied, and, when the adjustment member is in the Nth position the tool is operable in a drilling mode and the clutch is inoperable;

wherein the speed of rotation of the spindle is changed between the first and second speeds when the adjustment member is moved between the N−1 and Nth position;

wherein the clutch further comprises a thrust plate for transmitting the spring force to the second component of the clutch, the thrust plate having one or more tangs extending therefrom and arranged to engage with the adjustment member when the adjustment member is in the Nth position; and wherein the second clutch component comprises a plurality of ball bearings each disposed in a respective detent formed in a portion of the thrust plate.

7. A tool according to claim 6, wherein the adjustment member further comprises a first inner surface having one or more protrusions against which the thrust plate tangs are engageable when the adjustment member is in the Nth position.

8. A tool according to claim 7, wherein the thrust plate is immoveable in an axial direction when the adjustment member is in the Nth position.

9. A tool according to claim 6, wherein the first clutch component is coupled to, or integral with, a gear in the gearbox and comprises one or more ramps over which a ball bearing can pass when a torque force applied to the spindle exceeds a spring force applied to the second clutch component.

10. A tool according to claim 9, wherein the gear is a ring gear in a planetary gearbox.

11. A manually operable electrically powered tool, comprising:

an electric motor disposed in a housing;

a drive train disposed between the motor and a tool spindle, comprising:

a gearbox coupled to the motor and being arranged for changing the rotational speed of the spindle between a first and a second speed, and a clutch for interrupting drive from the motor to the spindle when a predetermined torque is applied to the spindle, wherein the clutch comprises two components urged together by a spring such that a first component is held in a stationary position relative to a second component when a torque force applied to the spindle is less than a threshold spring force; and an adjustment member for setting different modes of operation, the adjustment member being coupled to the gearbox and clutch, the adjustment member being moveable between a first and Nth position such that, when the adjustment member is in the range of positions between the first and N−1 positions the tool is operable in a screw driving mode and the spring force applied to the clutch components can be varied, and, when the adjustment member is in the Nth position the tool is operable in a drilling mode and the clutch is inoperable;

wherein the speed of rotation of the spindle is changed between the first and second speeds when the adjustment member is moved between the N−1 and Nth position wherein the adjustment member further comprises an inner surface coupled to, or engaging with, a gearbox linkage, the inner surface being arranged such that the linkage is moveable between a first disposition and a second disposition when the adjustment member is moved between the N and N−1 positions respectively.

12. A tool according to claim 11, wherein, during use, the rotational speed of the spindle changes between the first and second speeds when the linkage is moved between the first and second disposition.

13. A power tool, comprising:

an electric motor disposed in a housing;

a gearbox comprising a plurality of gears, wherein the gearbox is coupled to the motor and is operable to be switched between a first speed setting and a second speed setting;

a torque limiter which limits drive to the spindle when a predetermined torque is applied to the spindle; and an adjustment member operable to adjust the predetermined torque at which the torque limiter limits drive to the spindle;

wherein the adjustment member is further operable to switch the gearbox between the first and second settings by movement of at least one of the plurality of gears relative to the housing in an axial direction.

14. A tool according to claim 13, wherein the the adjustment member and the gearbox are coupled by a gear linkage which moves in a direction along or parallel to the longitudinal axis of the power tool.

15. A tool according to claim 13, wherein the adjustment member is mechanically coupled to the torque limiter and the torque limiter is moved between the first mode and the second mode through the mechanical coupling of the adjustment member and the torque limiter.

16. A tool according to claim 13, wherein the adjustment member is rotatable about a longitudinal axis of the spindle.

17. A tool according to claim 13, wherein the adjustment member is rotatable about a longitudinal axis of the motor.

18. A tool according to claim 13, wherein the gearbox is a planetary type gearbox and the at least one of the plurality of gears is a ring gear.

19. A power tool, comprising:

a housing;

a handle;

an electric motor disposed in the housing;

an output spindle; and a gearbox which comprises a plurality of gears, wherein the gearbox is coupled to the motor and is disposed between the motor and the output spindle;

wherein the power tool is operable in a first speed setting and a second speed setting and at least one of the plurality of gears of the gearbox is axially displaced when the power tool is switched between the first speed setting and the second speed setting;

wherein a user may set an upper limit on the amount of torque of the output spindle; and wherein the power tool further comprises an adjustment member which is operable to both switch the power tool between the first speed setting and the second speed setting and to set the upper limit on the amount of torque of the output spindle.

20. The power tool according to claim 19, wherein the gearbox is a planetary type gearbox and the at least one of the plurality of gears is a ring gear.

* * * * *